April 24, 1962  S. AGERBEK-POULSEN ET AL  3,031,272
BUBBLING TRACE ELEMENT DETECTOR
Filed March 14, 1960

INVENTORS:
Sven Agerbek-Poulsen
and Hugh E. Saunders
BY William Grobman
ATTORNEY United States Patent Office 3,031,272
Patented Apr. 24, 1962

3,031,272
BUBBLING TRACE ELEMENT DETECTOR
Sven Agerbek-Poulsen, Athens, Ohio, and Hugh E. Saunders, Davenport, Iowa, assignors to Mast Development Company, Inc., Davenport, Iowa
Filed Mar. 14, 1960, Ser. No. 14,831
8 Claims. (Cl. 23—254)

This invention relates to indicating devices, and more particularly, to precision instruments for detecting and measuring gaseous trace constituents in an atmosphere.

One of the most difficult measuring tasks is that of obtaining an accurate indication of the absolute or relative amount of trace material contained in an atmosphere. There is a substantial field of use for such devices, particularly in the present investigation of the earth's atmosphere as well as the detection of obnoxious gases in the open for military purposes or contained in the atmosphere of mines or other enclosures. A lightweight and accurate instrument for measuring such trace constituents in a gaseous atmosphere is particularly useful.

Some of the problems heretofore encountered have been those which are inherent in accurately measuring quantities of trace constituents. It is fairly easy to detect the presence of a gaseous constituent, but the construction of a precision instrument for obtaining an accurate measurement has heretofore not been fully successful. Generally, the devices for detecting and measuring trace constituents depend for their operation upon the chemical reaction produced by the passage of electrical energy through an electrolyte in which the gas sample has been dissolved or with which it has reacted. Electrical systems have been utilized for measuring the current flow, variations in resistance, or other modification in the electrical properties produced by the polarization or depolarization of electrodes. However, such measurements ordinarily depend for their accuracy upon a fully completed chemical reaction or physical change, and in prior art systems, the chemical reaction or physical change has not always been complete. To ensure that a device, which measures or indicates the rate of combinations or disassociations of compounds as an indication of the amount of constituents available, is accurate, care must be taken to measure the total number of molecules available in a known quantity of gas. This has been where most of the prior art devices have failed. It is difficult to ensure that the indication of an electrical measuring device or recorder actually indicates all of the trace material in the sample of gas tested.

It is, therefore, an object of this invention to provide a new and improved device for producing a quantitive indication of the amount of trace constituents present in a sample of gas.

It is another object of this invention to provide a new and improved device for accurately indicating the relative amounts of gaseous element present in a sample, which device is small, compact and lightweight.

It is a further object of this invention to provide a new and improved accurate gaseous measuring device.

It is yet a further object of this invention to provide a new and improved accurate gaseous measuring device which operates either intermittently or continuously, using very small quantities of active materials.

Other objects and advantages of this invention will become apparent as the following description proceeds, which description should be considered together with the accompanying drawings, in which.

In general, the instrument of this invention provides an automatic quantitative indication of high accuracy and sensitivity, either continuously or intermittently, of any of a plurality of pollutants in an atmosphere. By was of illustration, the ozone concentration of the atmosphere as low as a few parts of ozone per hundred million parts of air by volume can be detected and accurately measured by the instrument of this invention, and, if the device of this invention is connected with a suitable recording instrument, continuous recordings of the amount of ozone can be made.

In general, this invention may be utilized for sensing dilute constituents in gaseous form of an atmosphere, the constituents being those for which specific reagents are available. The characteristics of the reagents must be such that, in reacting with the particular constituent intended, ions are released and thus modify the electrolytic conductivity of the reagent. The changes in conductivity are proportional to the number of molecules of the constituents reacting with the reagent. Although the specific example of ozone has been mentioned, the instrument of this invention may be utilized for measuring such compounds as hydrogen sulfide, sulfur dioxide, and other such gaseous elements and compounds which may be present in an atmosphere in minute quantities.

Figure 1:
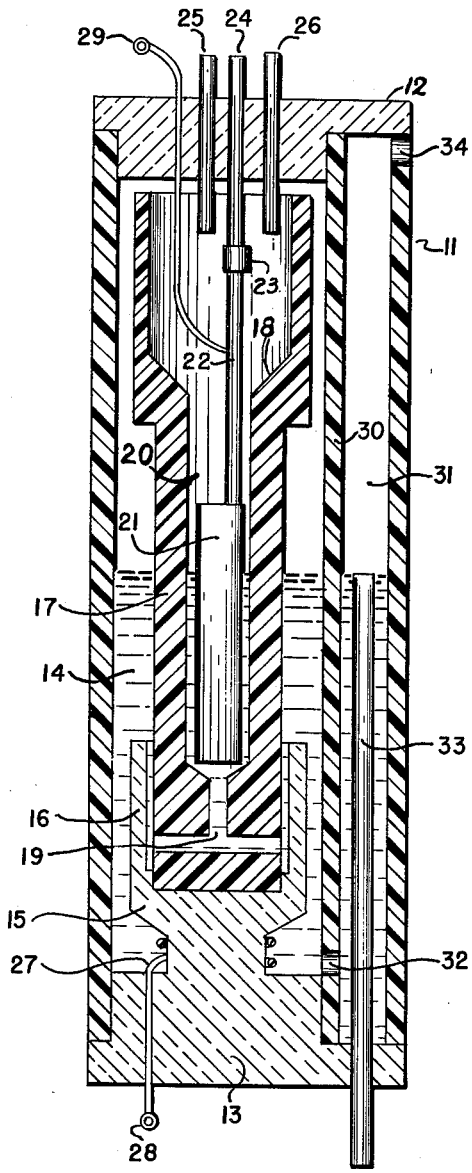
FIG. 1 is a sectional view of the sensing device of this invention.
Figure 3:
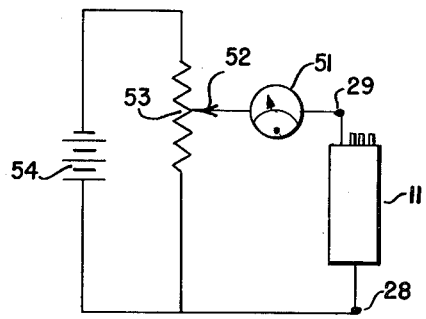
FIG. 3 is a circuit diagram of the instrument of this invention.

Referring now to FIG. 1 in detail, the reference character 11 designates a hollow housing of chemically inert material such as glass, porcelain, inert synthetic resin, or other such suitable material, having a central opening 14 sealed at one end by a cover 12 and at the other end by a sealing plug 13. Within the central bore 14 and supported on the plug 13 is a generally cylindrical body 17 having a reaction chamber 20 therein. The body 17 is supported on a cup-like support member 15 which has a high cylindrical rim 16 surrounding the lower portion of the body 17. The upper portion of the reaction chamber 20 is funnel-shaped at 18, and the bottom tapers to a narrow opening 19 which communicates with the interior of the rim 16 of the support member 15. Supported within the reaction chamber 20 is an elongated electrode 21 of platinum or other suitable electrically conductive material which is substantially inert to the reagent used and to the constituent being measured. A platinum, or other material, tube 22 forming part of the electrode 21 is connected by means of a plastic tube 23 to a pipe 24 penetrating the cover 12 of the housing 11. Pipes 25 and 26 also penetrate the cover 12 and open to the interior of the body 17. Around the base of the support member 15, a wire 27 of platinum or other suitable chemically inert material is wrapped to form a second electrode. The electrode 27 is connected to a terminal 28, for connection to external electrical components as shown in FIG. 3.

The housing 11 also contains a partition 30 to form a second hollow chamber 31. An opening 32 in the partition 30 connects the inner bore 14 with the hollow chamber 31. An opening 34 in the wall 11 allows the chamber 31 to communicate with the atmosphere. A solution overflow tube 33 entering the chamber 31 through sealing plug 13 leads waste and excess solution to a suitable waste container. In use, the bore 14 is filled with a suitable reagent to the level of the solution overflow tube 33 by means of a pipe 25 through the cover 12. When the reagent is admitted to the housing 11, it flows down through the reaction chamber 17 and the opening 19 into the central bore 14, down and around the anode 27 and into the hollow chamber 31 by way of opening 32. Excess reagent is removed through the solution overflow tube 33. The reagent thus covers most of the electrode 21 and all of the electrode 27. The atmosphere to be tested is pumped or otherwise applied through the pipe 24, down through the elongated tube 22, of the electrode 21, and is allowed to bubble up and around the inside of the electrode 21 into the reaction chamber 17 to be released in the upper portion 18 and expelled through pipe 26. For periods of sustained operation, additional reagent is gradually applied through the pipe 25 to renew that which is exhausted and/or lost by evaporation with expulsion of the gas being tested. As additional reagent is added, excess reagent and waste products of the reaction at the electrode 27 are removed from the body 17 by the solution overflow tube 33. The opening 34 maintains the chamber 31 at atmospheric pressure to aid in the excess solution removal.

Figure 2:
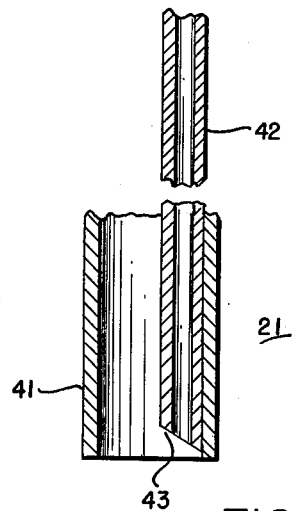
FIG. 2 is a sectional view of the cathode of the device of FIG. 1.

For a better understanding of the operation of the detector of this invention, reference is made to FIG. 2 which illustrates, in section, the electrode 21 greatly enlarged. The electrode 21 comprises a substantially large diameter tube 41, of platinum or other suitable material. A smaller diameter tube 42, of like material, is eccentrically attached to a side wall of the tube 41 and extends upwardly from the top portion thereof. The upper end of the elongated tube 42 is connected to the gas supply pipe 24, and the bottom end 43 of the tube 42 is cut at an angle to its longitudinal axis to allow the gas entering the tube 42 to bubble gradually out of the tube at the bottom 43 and upward through the interior of the large diameter tube 41. This provides a relatively long path for the gas to be tested to follow before it can pass out through the funnel portion 18 of the reaction chamber 20 and the pipe 26. By providing such a route, an intimate contact between the reagent and the trace constituent in the neighborhood of the electrode 21 is assured. In this manner the reaction of all of the molecules of the constituent material to be tested with the reagent is virtually assured.

Returning to a consideration of FIG. 1, as the gases entering tube 24 bubble upward around and out of the electrode 21, they agitate the reagent contained in the reaction chamber 17, and the funnel-shaped portion 18 of the reaction chamber allows for the return of droplets of reagent into the reservoir without being carried out through the exhaust pipe 26. By providing a narrow opening 19, and narrow annuluses between the cylindrical rim 16 and both the housing 11 and the outside of the cylindrical body 17, any agitation of reagent by the release of bubbling gases from the electrode 21 is maintained at a minimum outside of the reaction chamber 20. Also, intermixing of the reagent in the reservoir formed within the reaction chamber 20 and the reagent outside the body 17 is virtually eliminated. By thus maintaining two large masses of reagent relatively separate and distinct, the products of the reaction at one electrode are discouraged from migrating to the other electrode and thereby generating false indications.

When the electrical potential is applied between the electrodes 21 and 27, polarization occurs about the cathode or anode, or both, effectively insulating the electrodes and interrupting the flow of current. As the trace constituents in the gas being supplied through input pipe 24 reacts with the reagent contained in the reaction chamber 20, the polarized layer surrounding the cathode is removed in proportion to the amount of trace constituent present in the gas sample, allowing current to flow. The amount of current flowing in the circuit is proportional to the rate of action of the reagent with the trace material. This can be measured by suitable instruments in a circuit such as that illustrated in FIG. 3 where the housing 11 is schematically illustrated as a block having the profile determined by the three pipes 24, 25 and 26 extending from its upper portion. One side of a suitable electrical meter 51, such as a microammeter, is connected to the terminal 29, and the other side of the meter 51 is connected to the slide member 52 of a potentiometer. The potentiometer 53 is connected across a source of direct energy, shown here as a battery 54. The terminal 28 of the detector 11 is connected to the junction of the potentiometer 53 and the positive terminal side of the battery 54 establishing electrode 27 as an anode and electrode 21 as a cathode. A potential suitable for the conditions of operation and the materials used can be applied across the terminals 28 and 29 by positioning the slide member 52 on the potentiometer 53. Since the meter 51 is in series with the anode 27 and the cathode 21 of the detector 11, it measures the total amount of current flowing therebetween. As indicated above, the current flow through the housing 11 is determined by the number of molecules of the trace constituents being measured per unit volume of gas supplied to the input pipe 24 which react with the reagent in the chamber 20. Thus, the current flow through the meter 51 is a direct indication of the number of molecules of the trace constituents per unit volume in the atmosphere being tested.

As indicated above, the electrodes 21 and 27 may be either anodes or cathodes, but they should be so connected that the critical reaction takes place at the electrode 21. In this manner, the injection of the gas to be tested takes place in the vicinity of the proper electrode. The inner diameter of the reaction chamber 20 should be only slightly laregr than the outside diameter of the electrode tube 41. In this manner, a maximum amount of electrode surface is exposed to the reactants. Also, space is allowed between the cylinder 41 and the inner wall of the body 17 through which the reagent may be "pumped" by the bubbling action of the gas sample. As the gas passes up through the electrode 21 it tends to carry some reagent along with it, causing a constant circulation of the fluids in the reaction chamber 20. This circulation improves the chances for complete reaction and for accurate sensing of the reaction between the reagent and the trace substance being detected. By providing a reaction chamber which is only slightly larger than the cylindrical electrode 21, the significant reaction is confined to the immediate vicinity of the electrode 21. Only a small portion of the entire volume of reagent is exposed to the gas sample at any time providing almost instantaneous indication of the reaction taking place, yet assuring that a large supply of fresh reagent is always available. In addition, since the amount of reagent adjacent the cylindrical electrode 21 is comparatively small, small quantities of gas samples are sufficient to produce accurate indications. In addition, the construction of the reaction chamber 20 and electrode 21 are such that continuous studies may be readily undertaken with rapid indication of variations in the proportion of the contaminant being tested, or the supply of gas to the tube 24 may be intermittent. In either case, the system reacts quickly and accurately.

The instrument illustrated in FIG. 1 and described above is of general utility and may be used to measure the amounts of many trace constituents in an atmosphere. For general use, platinum is preferred for the electrodes 21 and 27. However, when ozone is being measured, the anode may be made of a metal which forms a water insoluble salt with iodine, neutralizing any free iodine which is formed at the anode. Such metals may be silver or mercury. For measuring the amount of ozone in an atmosphere, a reagent solution which comprises, by way of example only, 100 cc. of redistilled water, 2 gr. of potassium iodide, 20 gr. of potassium bromide, 0.4 gr. of $NaH_2PO_4 \cdot 2H_2O$, and .32 gr. of $Na_2HPO_4$ or an equivalent buffer for neutrality may be used.

Again, to illustrate the operation of the device, the detection of ozone can be considered. When a potential from the potentiometer 53, which is less than the decomposition potential for the reagents used, is applied across the input terminals 28 and 29, both of the electrodes are polarized by an initial current through the meter 51. When the polarization of the electrodes reaches equilibrium, current ceases to flow until such time as an external factor such as the reagent with ozone disturbs the equilibrium. As an example of the potential applied, the battery 54 may be a 1.5 volt battery, such as a standard dry cell, and the actual potential applied between the input terminals 28 and 29 may be somewhere in the range of 0.15 to 0.25 volt. The exact potential is seldom critical so long as it remains constant and less than the decomposition potential for the reagents being used. When ozone is present in the gas being applied to input pipe 24, it reacts with the reagent to form free iodine in the solution in the reaction chamber 20 as indicated by the equation (A) $\quad 2KI + O_3 + H_2O \rightarrow 2KOH + 2O_2 + I_2$ The free iodine which is thus formed is reduced electrically into iodide ions at the surface of the cathode 21 to form (B) $\quad I_2 + 2e \rightarrow 2I^-$ where $e = 1$ electron.

At the same time, a corresponding amount of free iodine is formed at the anode by the reverse reaction of the ionization shown in Formula B. The free iodine formed at the anode remains there due to the construction of the body support member 15 mentioned above or it is flushed out through the opening 32 and the overflow 33. In either case it does not again enter into the reaction. When the anode is made up of a metal which forms a salt with iodine, which salt is insoluble in water, the free iodine is neutralized at the anode as soon as it is formed and, in that case, the anode may be placed in the same chamber as the cathode. However, better stability over a longer period of time and greater versatility of the instrument is obtained when the cathode 21 is physically separated from the anode 27 as shown in FIG. 1. For each molecule of ozone reaching the reaction chamber and reacting with the reagent contained therein, two electrons are freed to free hydrogen from about the cathode and to flow through the circuit, and this electron flow determines the current reading on the meter 51. In turn, the flow of electrons is itself determined by the rate at which the ozone molecules arrive at the reaction chamber 17. For ozone concentration normally found in the atmosphere and for a rate of flow of air through the apparatus of about 140 cc. per minute, the current flowing in the circuit is often in the range of from 1 to 7 microamperes.

The above specification has described a new and improved apparatus for measuring trace constituents in an atmosphere. It is understood that the above description may indicate other forms in which the principles of this invention may be used without departing from the invention itself, and, therefore, this invention is intended to be limited only by the scope of the appended claims.

We claim:

1. Apparatus for measuring the proportional amount of gaseous contaminant contained in samples of a gas mixture, said apparatus comprising a hollow housing, a first means penetrating said housing for introducing into the interior thereof preselected amounts of a fluid which reacts with the contaminant to be measured to release ions in an amount proportional to the number of molecules of said contaminant present, a first electrode in said housing arranged to be at least partially immersed in said fluid, a generally hollow cylindrical second electrode in said housing at least partially filled and at least partially immersed in said fluid, second means penetrating said housing for injecting atmospheric samples into said housing, means connecting said second electrode to said second means for injecting atmospheric samples whereby atmospheric samples injected into said housing pass through the interior of said second electrode into said fluid to react with said fluid, said hollow electrode being spaced slightly from the interior of said hollow housing so that the injection of atmospheric samples through the interior of said hollow electrode and into said fluid effectively circulates said fluid to maintain fresh fluid in contact with injected atmospheric samples, means surrounding said second electrode for effectively hindering the circulation of said fluid between said first and second electrodes without electrically insulating one from the other, and means for connecting a source of electrical energy and indicating means to said first and second electrodes to indicate the rate of release of ions within said housing.

2. A bubbling-type device for measuring the amount of a gaseous trace constituent in a gas sample; said device comprising a cylindrical reaction chamber; a fluid which reacts with the trace constituent to be tested to release ions; said fluid being contained within said reaction chamber; a first electrode substantially immersed in said fluid; a hollow second electrode, open at both ends, disposed within said chamber, spaced from said first electrode, and substantially immersed in said fluid; said fluid at least partially filling said second electrode; means for injecting samples of gas to be tested into said second electrode whereby said gas samples pass through said hollow second electrode in intimate contact with said fluid and are discharged from said second electrode into the fluid in said reaction chamber; said second electrode being slightly smaller in diameter than the interior diameter of said reaction chamber to provide a narrow annular space between the exterior of said second electrode and the interior of said chamber whereby injection of gas samples to the interior of said second electrode produces a circulation of the fluid within said chamber to continually present fresh fluid to the gas sample being injected; means separating said first and second electrodes to discourage the circulation of said fluid therebetween, said separating means being perforated to provide electrical conduction paths between said first and second electrodes; and means for connecting a source of electrical energy and a means for measuring electrical current flow to said first and second electrodes to indicate the rate at which ions are released by the reaction of the trace constituent to be measured with said fluid.

3. Apparatus for measuring the amount of a gaseous trace constituent present in an atmosphere, said apparatus comprising a hollow housing having a first end closed, a fluid reagent contained within said housing, said reagent reacting with the trace constituent to be measured to release ions in proportion to the amount of trace constituent so reacting, a first electrode in said housing at least partially immersed in said fluid, a tubular second electrode immersed in said fluid so that said fluid at least partially fills said second electrode, means for injecting gas samples into said second electrode, means for connecting a source of electrical energy and electrical current flow measuring means to said first and second electrodes, a reaction chamber within said housing and surrounding said second electrode, said chamber having passages and ports connecting the interior of said chamber with the exterior of said chamber, said reaction chamber having a funnel-like opening at one end and wherein said means for injecting gas samples penetrates said one end of said housing whereby gas samples injected into said housing pass through the interior of said hollow second electrode in intimate contact with the fluid contained therein and are expelled from said second electrode into said reaction chamber, and further including second means penetrating said one end of said housing and in communication with said one end of said reaction chamber for the expulsion of gas samples from said housing.

4. The apparatus defined in claim 3 further including third means penetrating said one end of said housing for introducing additional fluid to the interior of said housing, and an overflow for the discharge of excess and spent fluid from said housing.

5. Apparatus for measuring the amount of a gaseous trace constituent present in an atmosphere, said apparatus comprising a hollow housing having a first end closed, a fluid reagent contained within said housing, said reagent reacting with the trace constituent to be measured to release ions in proportion to the amount of trace constituent so reacting, a first electrode in said housing at least partially immersed in said fluid, a tubular second electrode immersed in said fluid so that said fluid at least partially fills said second electrode, means for injecting gas samples into said second electrode, means for connecting a source of electrical energy and electrical current flow measuring means to said first and second electrodes, a reaction chamber within said housing and surrounding said second electrode, said chamber having passages and ports connecting the interior of said chamber with the exterior of said chamber, said first electrode is positioned within said housing exterior to said reaction chamber.

6. Apparatus for measuring the amount of a trace constituent in a fluid mixture, said apparatus comprising a hollow housing having a first end and a second end, means closing said first end, a plug sealing said second end, said plug having an internal concavity, a reaction chamber supported in said concavity within said housing, said chamber having passages adjacent said plug for connecting the interior of said chamber with the exterior of said chamber, a high rim on said plug surrounding said passages, a fluid reagent adapted to react with the constituent to be measured to release ions, said reagent at least partially filling said housing and said reaction chamber, a generally tubular first electrode in said chamber immersed in said fluid, said fluid at least partially filling said first electrode, means penetrating said means closing said first end an connected to said first electrode for injecting fluid samples to be tested into said first electrode so that said samples pass through said first electrode and are expelled into said reaction chamber, a second electrode supported on said plug within said housing but without said reaction chamber, means penetrating said housing for expelling tested fluid samples, and means for connecting a source of electrical energy and an electrical current flow measuring device to said first and second electrodes.

7. Apparatus for measuring the proportion of a gas sample that comprises a trace constituent, said apparatus comprising a generally cylindrical perforated reaction chamber having therein a first electrode of generally cylindrical shape, the inside diameter of said chamber being slightly larger than the outside diameter of said first electrode, a housing surrounding said chamber, a fluid reagent contained within said housing and at least partially filling said chamber and said perforations and said first electrode, a second electrode within said housing but without said chamber, said perforations being sufficiently large to permit communication between the fluid within and without said chamber but sufficiently small to deter free circulation of said fluid therethrough, said second electrode being immersed in said reagent whereby an electrical conduction path is provided through said fluid between said electrodes, said chamber tending to inhibit the circulation of fluid between said first and second electrodes, means for injecting gas samples into said housing and into the interior of said first electrode so that said injected gas samples pass through the reagent within said first electrode and bubble through the reagent external to said first electrode but within said chamber, the bubbling of said gas samples serving to circulate the reagent inside said chamber and inside said first electrode so that fresh reagent is always presented to gas being injected, and means external to said housing for connecting a source of electrical energy and an electrical measuring device to said first and said second electrodes so that the flow of current between said first and second electrodes and through said reagent induced by the source of electrical energy may be measured by said measuring device.

8. Apparatus for measuring the proportion of a trace constituent contained within a sample of gas, said apparatus comprising a generally cylindrical reaction chamber, a generally cylindrical hollow first electrode within said chamber, a housing surrounding said chamber and containing a reagent which reacts with the trace constituent to be measured to release ions in proportion to the number of molecules of constituent entering the reaction, said reagent at least partially filling said chamber and said first electrode, a second electrode supported within said housing in said reagent but without said chamber whereby said chamber tends to discourage the circulation of reagent between said first and second electrodes, said chamber being perforated to provide electrical conduction paths through said reagent between said first and second electrodes, means connected to said first electrode for forcing samples of a gas to be tested into said first electrode and out of said first electrode into the reagent outside of said first electrode but inside of said chamber, the reagent in said first electrode and chamber being circulated by said gas samples, and means for connecting to said first and second electrodes external to said housing a source of electrical energy and an electrical measuring device so that the electrical current flowing between said first and second electrodes through said reagent may be measured.

References Cited in the file of this patent

UNITED STATES PATENTS

| | | |
|---|---|---|
| 2,230,593 | Hassler | Feb. 4, 1941 |
| 2,789,887 | Cruikshank | Apr. 23, 1957 |
| 2,795,756 | Jacobson | June 11, 1957 |